E. B. Beach.
Screw-Cutting Tool.

Nº 73431          Patented Jan. 21, 1868.

Witnesses                                Edgar B. Beach
J. H. Shumway                               Inventor;
A. J. Tibbits                            By his Attorney
                                         John E. Earle

United States Patent Office.

EDGAR B. BEACH, OF WEST MERIDEN, CONNECTICUT.

Letters Patent No. 73,431, dated January 21, 1868.

---

IMPROVEMENT IN SCREW-CUTTING TOOL.

---

The Schedule referred to in these Letters Patent and making part of the same.

---

TO ALL WHOM IT MAY CONCERN:

Be it known that I, EDGAR B. BEACH, of West Meriden, in the county of New Haven, and State of Connecticut, have invented a new Improvement in Screw-Cutting Tool; and I do hereby declare the following, when taken in connection with the accompanying drawings, and the letters of reference marked thereon, to be a full, clear, and exact description of the same, and which said drawings constitute part of this specification, and represent, in—

Figure 1:
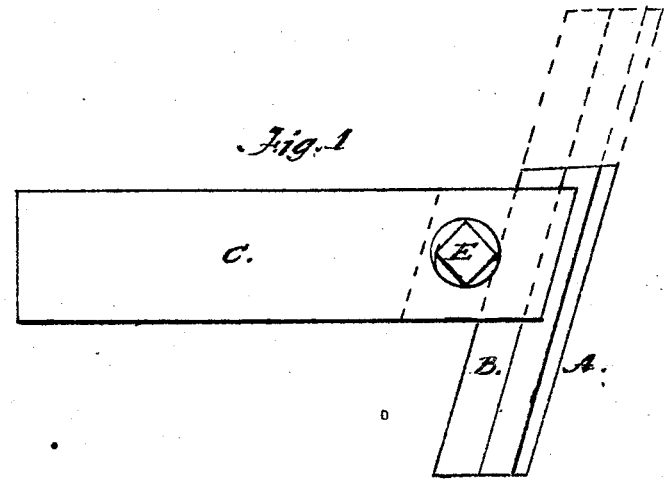

Figure 1, a side view, and in

Figure 2 a top view.

This invention, though designed particularly for a screw-cutting tool, may be applied to tools for general turning, the object being to construct a cutter which shall retain its form without being "reset" every time it is ground, and thus avoid the necessity of employing the most skilful workmen for this class of work; and the invention consists in a cutter formed so as to be attached upon one side of the shank, and inclined in the said shank so that the face or edge of the cutter will be at the proper angle to the work to be done, and so that by simply grinding the upper end of the cutter the tool will be sharpened, and the said shank provided with a device for securing the cutter upon the said one side.

To enable others to construct my improvement, I will proceed to describe the same as illustrated in the accompanying drawings.

Figure 2:
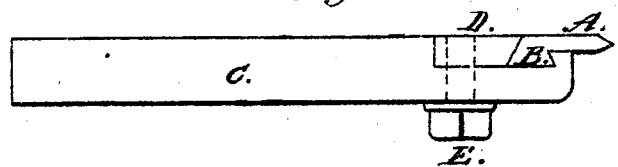

A is the cutter, formed from a piece of steel of the proper length, say two, or three times the width of the shank, and the edge of the cutter straight and of the proper form of the thread to be cut, or the purpose to which the tool is to be applied. If for a right-hand tool, upon the right-hand side of the cutter I form a dove-tail flange, B. C is the shank, in size according to the lathe or machine into which it is to be placed, and if for a right-hand tool, I form a groove across the left-hand side, at an angle corresponding to the required inclination of the cutter, as denoted in fig. 1, the outer edge of the said groove corresponding to the outer incline of the dove-tail on the cutter, and back of the said groove I form a space large enough to receive a block, D, which is formed with an incline corresponding to the other incline of the dove-tail on the cutter, as seen in fig. 2, and through the shank C, I fix a screw, E, into the block D, which will bind the block D hard into the recess against the cutter, and so as to firmly hold the cutter in position. The cutter being thus formed, and placed in the shank, the upper end ground so as to present an edge, as seen in fig. 1, the cutter is ready for use and inserted in the machine in the usual manner. By this construction the cutter may be formed in a bar in a planing-machine, and the bar cut into pieces the proper length, and thus, at small expense, producing most perfect cutters, and, thus adjusted in the shank, the cutter will run close to a shoulder when employed for cutting a right-hand thread, and when it requires sharpening the workman has simply to grind off the upper end, the edge being always preserved, so that no skill is required to keep the tool in order, as is the case in the common screw-cutting tools. The angle, being first formed, is always retained, and being fixed in the shank, as described, the cutter may be easily raised or lowered by loosening the block D, thus affording a simple and easy adjustment.

I have thus far described my invention as for cutting a right-hand screw. If a left-hand screw is required, then a cutter similarly formed, or the same cutter inverted, is placed in the shank, having the groove formed in the opposite side; otherwise the same.

Having thus fully described my invention, what I claim as new and useful, and desire to secure by Letters Patent, is—

The cutter A, provided with the flange B, attached to one side of a shank, substantially in the manner herein set forth.

EDGAR B. BEACH.

Witnesses:
JOHN E. EARLE,
A. J. TIBBITS.